United States Patent
Sjanic

(10) Patent No.: US 7,363,152 B2
(45) Date of Patent: Apr. 22, 2008

(54) METHOD AND SYSTEM FOR CALCULATING A FLIGHT ROUTE

(75) Inventor: Zoran Sjanic, Linköping (SE)

(73) Assignee: SAAB AB, Linköping (SE)

(*) Notice: Subject to any disclaimer, the term of this patent is extended or adjusted under 35 U.S.C. 154(b) by 310 days.

(21) Appl. No.: 10/503,724

(22) PCT Filed: Jan. 29, 2003

(86) PCT No.: PCT/SE03/00149

§ 371 (c)(1),
(2), (4) Date: Aug. 6, 2004

(87) PCT Pub. No.: WO03/067192

PCT Pub. Date: Aug. 14, 2003

(65) Prior Publication Data

US 2005/0150997 A1 Jul. 14, 2005

(30) Foreign Application Priority Data

Feb. 8, 2002 (SE) .................................... 0200395

(51) Int. Cl.
G01C 21/20 (2006.01)
G08G 5/02 (2006.01)
G06F 19/00 (2006.01)

(52) U.S. Cl. .............................. 701/209; 701/4; 701/9; 701/10; 340/945; 340/970; 342/29

(58) Field of Classification Search ............. 701/3, 701/4, 14, 18, 201, 209, 210, 9, 10; 244/3.1; 340/945, 970; 342/29

See application file for complete search history.

(56) References Cited

U.S. PATENT DOCUMENTS

| 4,812,990 | A | * | 3/1989 | Adams et al. ................. 701/3 |
| 5,838,262 | A | * | 11/1998 | Kershner et al. ........... 340/945 |
| 6,085,147 | A | | 7/2000 | Myers |
| 6,134,500 | A | * | 10/2000 | Tang et al. ................. 701/202 |
| 6,138,060 | A | * | 10/2000 | Conner et al. ................. 701/9 |
| 6,148,259 | A | | 11/2000 | Hagelauer |
| 6,163,744 | A | * | 12/2000 | Onken et al. ................. 701/3 |
| 6,259,988 | B1 | * | 7/2001 | Galkowski et al. ......... 701/202 |
| 6,266,610 | B1 | | 7/2001 | Schultz et al. |
| 6,289,277 | B1 | * | 9/2001 | Feyereisen et al. ......... 701/202 |
| 6,421,603 | B1 | * | 7/2002 | Pratt et al. ................. 701/206 |
| 6,519,527 | B2 | * | 2/2003 | Shinagawa .................. 701/209 |
| 2002/0097169 | A1 | * | 7/2002 | Johnson et al. ............. 340/970 |
| 2002/0183922 | A1 | * | 12/2002 | Tomasi et al. .............. 701/202 |

* cited by examiner

Primary Examiner—Tan Q. Nguyen
(74) Attorney, Agent, or Firm—Venable LLP; Michael A. Sartori

(57) ABSTRACT

The invention concerns a method and a system for calculating a flight route between a first position and a second position. According to the method, the first position is chosen as the current position, and the following steps are then repeated until the second position is reached: a loss function is determined corresponding to each flight path in a set of flight paths that are predefined in relation to the current direction of flight; a flight path that yields the most advantageous value for the loss function is selected; a subsection from the current position and a predetermined number of positions forward are registered for the selected flight path, and the position at the end of the subsection is chosen as the new current position.

8 Claims, 3 Drawing Sheets

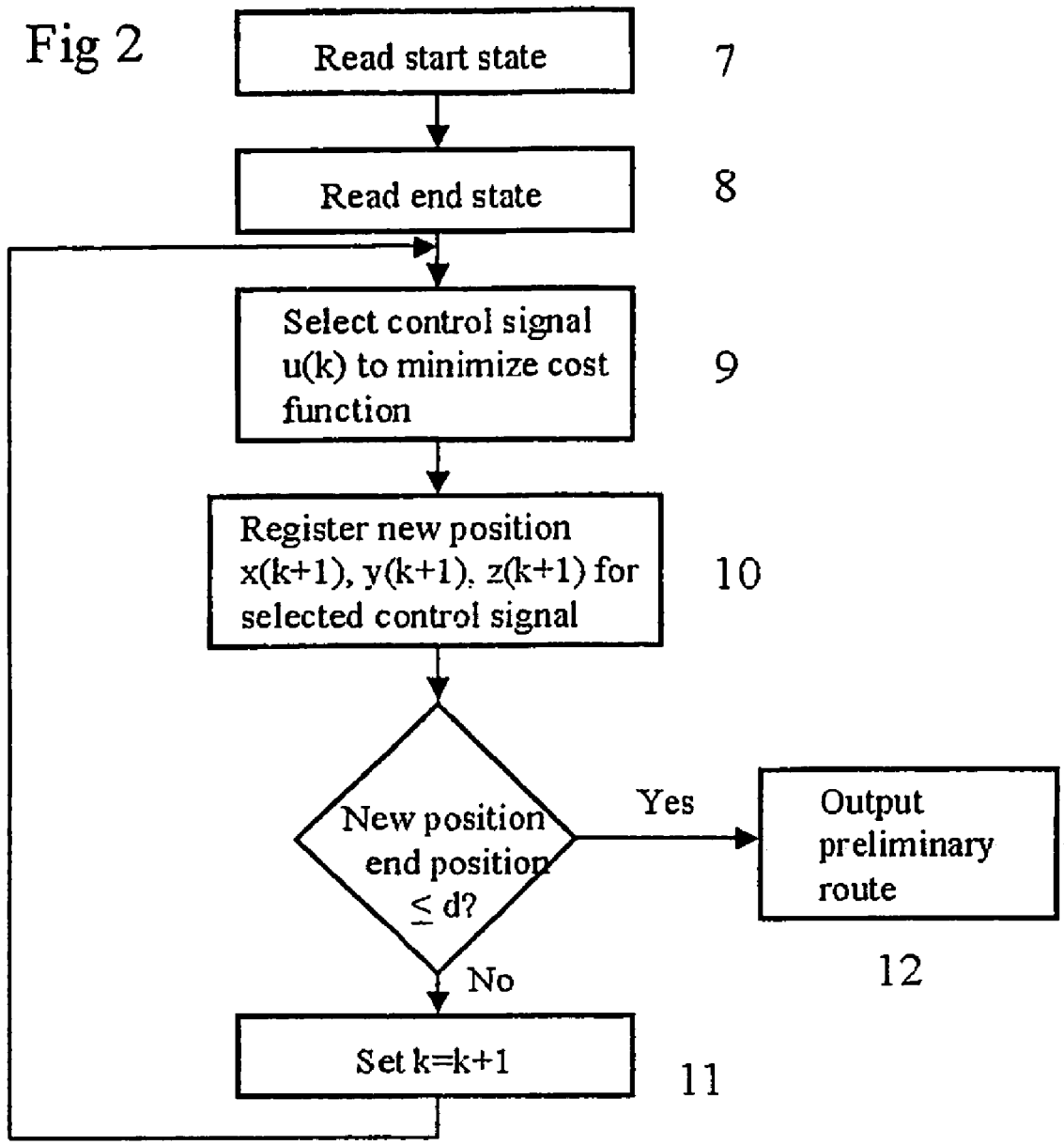

METHOD AND SYSTEM FOR CALCULATING A FLIGHT ROUTE

TECHNICAL AREA

This invention concerns a method and a system for calculating a flight route for an aircraft between a first position and a second position.

STATE OF THE ART

In the case of, e.g. reconnaissance or fighter missions, a mission plan is normally prepared before the mission begins. At that time the pilots plan their routes and input them into their aircraft computers. The input route is then displayed on a display unit arranged in the aircraft, whereupon the pilot can fly along the input route. If something unforeseen happens during the flight and compels the pilot to deviate from the input route, then the pilot must normally attempt to return to the input route as soon as possible.

It is not always feasible to return to the input route after an evasive maneuver. For example, such a return might entail so large a detour that the fuel supply will not suffice. It can also be difficult to return to the route because of impediments that lie in the way, e.g. in the form of hostile radar, extremely uneven terrain, etc. As a result, the need exists to be able to replan a mission while the mission is being carried out.

Current studies have been made in which replanning solutions have been developed wherein a new route is automatically generated during the flight. These studied solutions are however encumbered by the disadvantage that the new routes can be calculated in only two dimensions, i.e. the route is assumed to be flown at constant altitude. This entails that these solutions cannot include the possibility that the terrain or threat can be flown over. As a result, the replanned routes are characteristically long and, in turn, fuel-intensive.

SUMMARY OF THE INVENTION

One purpose of the invention is to provide an improved, vis-à-vis the known art, means of calculating a flight route between a first position and a second position in which threat exposure is taken into account, and which also enables calculation of the flight route both vertically and horizontally.

This has been achieved in an embodiment by means of a method in which the first position is initially selected as the current position, and wherein the following steps are repeated until the second position is reached:

- a loss function is determined corresponding to each flight path in a set of flight paths that are of equal length and predefined in relation to the current direction of flight;
- a flight path that yields the most advantageous value for the loss function is selected;
- a subsection from the current position and a predetermined number of positions forward is registered for the selected flight path, and
- the position at the end of the subsection is chosen as the new-current position.

The method is intended for use in aircraft, e.g. fighter aircraft, reconnaissance aircraft and, unmanned aircraft. The method is time-discrete, so that the loss function for each tested flight path is calculated as a sum of the "losses" for a number of calculating positions along the flight path. In one embodiment of the invention only the first calculating position is registered, whereupon it is given as the new current position and the method is repeated as described above.

According to one embodiment of the invention, the flight paths in the flight path set are chosen based on a control signal sequence associated with each flight path. For technical reasons associated with the calculating process, it is advantageous if the second through the final signal in each control signal sequence are zeroed.

The loss function preferably comprises one or more of the following parameters a) a first parameter that indicates whether the tested flight path crosses a pre-defined threat zones, b) a second parameter that indicates whether the tested flight path passes too near to the terrain, c) a third parameter that indicates whether the tested flight path exceeds a pre-defined altitude value, d) a fourth parameter that indicates whether the tested flight path is costly from a fuel standpoint, and e) a fifth parameter that indicates the distance to the second position of the route.

When necessary, the method can be supplemented with a refining step in which registered points located as far from one another as possible, but between which unobstructed visibility prevails, are marked as breakpoints, and in which the route is selected as straight lines between these marked breakpoints.

The invention also comprises a system for realizing the foregoing method. The system comprises a terrain database arranged so as to store terrain data, including latitude and longitude data with associated altitude data or the like; a threat database arranged so as to store data concerning threats that includes at least data regarding the geographic extent of the threats, and a first calculating unit that is operatively connected with the terrain database and the threat database and arranged so as to calculate the route between the first and the second positions.

In cases where the system is also arranged so as to perform the refining step, the first calculating unit, the terrain database and the threat database are operatively connected to a second calculating unit, which is arranged so as to receive the flight route calculated by the first calculating unit and refine it, whereupon registered points that are located as far as possible from one another but between which unobstructed visibility prevails are marked as breakpoints, and in such a way that the route is selected as straight lines between these marked breakpoints.

The method and system according to the invention enable the prediction of a three-dimensional route that takes an aircraft to an end point with minimized risk of entering the threat zones, and along which the aircraft can fly as low as possible without risk of colliding with the terrain. The method is also highly computation-efficient, and a route can generally be planned in the course of several seconds.

BRIEF DESCRIPTION OF FIGURES

FIG. 2 shows a flow diagram that illustrates the function of the first calculating unit in the system in FIG. 1.

PREFERRED EMBODIMENTS

Figure 1:
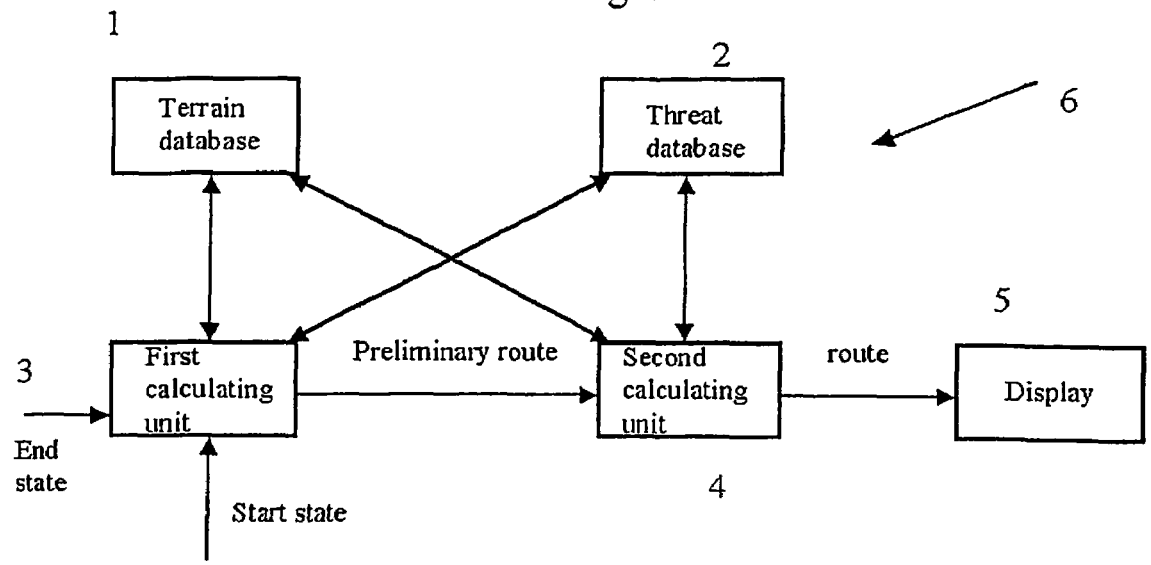
FIG. 1 shows a block diagram illustrating an example of a system for mission planning, intended for aircraft.

Reference number 6 in FIG. 1 designates a system for calculating a route for an aircraft between a start position and an end position. The system 6 comprises a terrain database 1, a threat database 2, a first calculating unit 3 for calculating a preliminary route, a second calculating unit 4 for modifying the preliminary route, and a display 5. The system 6 can be built into the aircraft in its entirety. Alternatively, the entire system can be housed in a ground-based station (not shown), in which case data concerning the current position (start position) of the aircraft and its final objective are communicated to the ground-based station via a link, whereupon the ground-based station calculates a route and returns coordinates for that route to the aircraft. In yet another example, some parts of the system 6 are arranged at the ground-based station, while the rest are arranged in the aircraft. The aircraft consists of, e.g. a military reconnaissance plane, a military fighter plan or an unmanned aircraft. In the description to follow, an unlimited example will be used in which the aircraft is an airplane.

The terrain database 1 stores terrain data for large land areas. In one example the terrain database 1 contains altitude data stored at 50 meter intervals along with associated latitude and longitude data or the like. The altitude values between these sampling points can be derived by bilinear interpolation. Threats are stored in the threat database 2. Each threat has a geographic position. A range is also linked to each threat. In an example where the threat is a radar station, a specific coverage area is linked to the radar. The size and orientation of the coverage area are determined by the power of the radar and how it is directed. In another example the threat is a missile fired from a launch ramp. The missile also has a geographical position and a range.

The first route-calculating unit 3 is connected to the terrain database 1 and the threat database 2. The start state and end state are input into the calculating unit 3. The start state characteristically defines the current position of the aircraft, i.e. its starting position, and is represented by, e.g. latitude, longitude and altitude. In this exemplary embodiment the calculating unit 3 can be connected to a GPS receiver that furnishes relevant latitude, longitude and altitude data. The end state is defined as the final objective of the airplane, and is represented by e.g. an end position and bearing. The end position is specified by, e.g. latitude, longitude and altitude. It is advantageous to include a bearing in the end state because the airplane usually has to land at its final objective, whereupon the plane must approach the landing strip from an angle that permits a landing to be made. The end state is input via, e.g. an input device arranged in the cockpit. Alternatively, the end state data can be fed to the plane via a link for forwarding to the calculating unit 3. The calculating unit 3 calculates the preliminary route based on the input start state and end state data, and on the data in the terrain database and the threat database. The preliminary route is fed to the second calculating unit 4, which is also in communication with the terrain database 1 and the threat database 2. The second calculating unit 4 calculates the modified route based on the input preliminary flight path and the data in the terrain database and the threat database. The modified flight path is fed to the display 5 for presentation. Presentation of the flight path can be achieved by, e.g. displaying the coordinate data or via a graphic illustration of the route in the terrain. The modified route characteristically consists of a number of breakpoints, specified in three dimensions, with straight flight paths between them.

Figure 3:
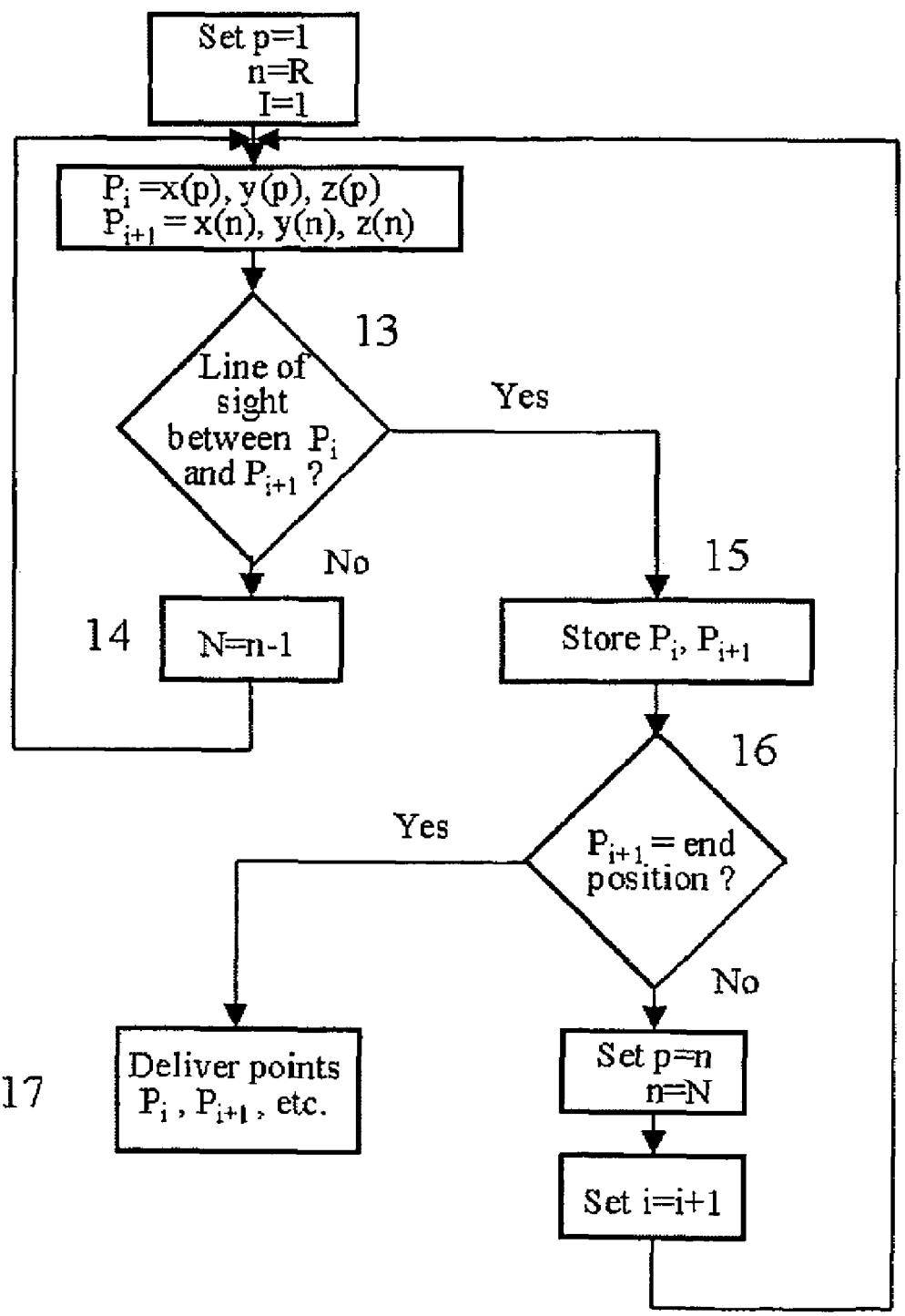
FIG. 3 shows a flow diagram that illustrates the function of the second calculating unit in the system in FIG. 1.

In FIG. 3 the calculating unit 3 reads 7 first the start state and then 8 the end state. In an example that is not shown, the start and end states are read in reverse order. The calculating unit 3 then uses so-called MPC (Model Predictive Control) in a modified form as described below to determine the preliminary route. Implementing the MPC algorithm requires a state description for the system that is to be controlled. The state description for a non-linear model takes the general form:

$$x(k+1) = f(x(k), u(k))$$

$$u(k) \in U$$

In a simple embodiment, a three-dimensional point-mass model with constant speed is used. The direction of the speed vector of the point can be controlled by a control signal comprising a control signal component $u_\Theta$ for conversion in the vertical plane and a control signal component $u_\varphi$ for conversion in the horizontal plane. In accordance with this simple point-mass model, the following state vector $x(k+1)$ is used:

$$x(k+1) = \begin{pmatrix} x_1(k+1) \\ x_2(k+1) \\ x_3(k+1) \\ x_4(k+1) \\ x_5(k+1) \end{pmatrix} =$$

$$\begin{pmatrix} \theta(k+1) = \theta(k) + \theta_0 u_\theta(k) \\ \varphi(k+1) = \varphi(k) + \varphi_0 u_\varphi(k) \\ x(k+1) = x(k) + s_0 \cos(\varphi(k) + \varphi_0 u_\varphi(k))\cos(\theta(k) + \theta_0 u_\theta(k)) \\ y(k+1) = y(k) + s_0 \sin(\varphi(k) + \varphi_0 u_\varphi(k))\cos(\theta(k) + \theta_0 u_\theta(k)) \\ z(k+1) = z(k) + s_0 \sin(\theta(k) + \theta_0 u_\theta(k)) \end{pmatrix}$$

Note that the states $x_3$, $x_4$ and $x_5$ in the example shown represent the Cartesian coordinates x, y and z, representing e.g. latitude, longitude and altitude. Assuming that the speed is constant, it follows that $s_0$ is a constant that denotes the distance that the aircraft is assumed to cover between two calculation points. $s_o$ is thus a constant that depends on the flight speed and sampling interval. In one embodiment the sampling interval is chosen so that $s_o$ is 200-300 m, e.g. 250 m. $\theta_o$ and $\phi_o$ are predefined angular constants, where $\theta_o$ indicates an angle in the vertical plane and $\phi_o$ indicates an angle in the horizontal plane. For example, $\theta_o = \pi/24$ rad and $\phi_o = \pi 12$ rad. To simplify the subsequent calculations, it is assumed that the control signals $u_\Theta$, $u_\phi$ can only assume a number of predefined values. All states in the state matrix are measurable.

In determining the preliminary route, a cost function is used in the next step 9 in FIG. 2.

$$J(k) = \sum_{j=k}^{k+N-1} g^T(j|k) Q_1 g(j|k) + Q_2 h(j|k)$$

where in one example g(j|k) and h(j|k) are chosen as follows:

$$g(j|k) = \begin{bmatrix} x(j|k) - x_{end} \\ y(j|k) - y_{end} \\ z(j|k) - z_{end} \end{bmatrix}$$

-continued $$h(j|k) = \begin{bmatrix} \mathrm{terr}(x(j|k), y(j|k), z(j|k)) \\ \mathrm{threat}(x(j|k), y(j|k), z(j|k)) \\ \mathrm{height}(z(j|k)) \\ \mathrm{fuel}(\theta(j|k)) \end{bmatrix}$$

$x_{end}$, $y_{end}$ and $z_{end}$ represent the coordinates for the end state (in the state matrix, the end states for $x_3$, $x_4$ and $x_5$), and thus here perform the function of a constant reference signal. The functions terr(x,y,z) and threat(x,y,z) yield the value 1 if the position x(j|k), y(j|k), z(j|k) determined from states $x_3$, $x_4$ and $x_5$ is located below the terrain or in a threat zone, while it yields the value 0 if such is not the case. In an expanded embodiment, a determination is made as to whether, in the given case, the position lies in a threat zone if so-called radar shadow prevails, i.e. whether there is a line of sight between the threat and the point, or if terrain is interposed. If radar shadow does prevail, then threat(x,y,z) will yield the value 0 even if the position is located in a threat zone. The function height(z) yields the value 1 if the plane climbs above a predetermined altitude $z_{max}$, and the value 0 if such is not the case. The predetermined altitude $z_{max}$ is set so as to prevent the aircraft from flying unnecessarily high, with the risk associated therewith, over as large an area as possible. The function fuel($\theta$(j|k)) indicates the fuel consumption in accordance with a simple model, e.g.:

$$\mathrm{fuel}(\theta(j|k)) = s_0 e^{c \cdot \theta(j|k)}$$

where c is a constant with a predefined value. At least when the airplane begins to approach its final objective, its bearing should also be included in the cost function if the plane is to go in for a landing.

The cost function J(k) is evaluated for a predefined prediction horizon N. For example, the prediction horizon is chosen so that the cost function is minimized for a flight segment of 5-20 km. In one example where $s_o$=250 m and N=50, the cost function is minimized for a flight segment of 12.5 km. The flight segment that is evaluated is characteristically substantially shorter than the distance between the start position and the end position.

When evaluating the cost function, a test is run to determine which values the function yields for a number of predefined control signals x $u_\Theta$, $_{u\phi}$ whereupon the control signal $u_\Theta$, $u_\phi$ that minimizes the cost function is chosen. In one example U=(−3, −2, −1, 0, 1, 2, 3), in which example the control signal $u_\Theta$, $u_\phi$ can assume 49 different values ((−3, −3), (−3, −2) . . . ). To reduce the calculation load, a control signal horizon M is also set equal to 1. This means that only the first control signal prediction u(k|k) is optimized, the rest of the control signals u(k+j|k), j=1, . . . , N−1 are given the value 0. In this way the cost function J(k) is evaluated along rays in a cone in the three-dimensional space. Each ray represents a potential flight path whose length depends on the prediction horizon N and the sampling interval. The number of flight paths for which the loss function is calculated can be limited to further reduce the calculation load.

$Q_1$ and $Q_2$ in the cost function J(k) are weight matrices defined as follows:

$$Q_1 = \alpha 1$$

$$Q_2 = [\beta_1\ \beta_2\ \beta_3\ \beta_4]$$

The way in which the values in the weight matrices are to be chosen does not fall within the scope of this application, but generally speaking the value of $B_1$, which determines the weight according to the plane not crashing into the terrain is set very high, while $B_2$, which determines the weight accorded to the plane not flying into a threat zone is generally set to a lower value. For example, the value of $B_2$ can depend on the nature of the threat. The value of $B_3$, which indicates the weight accorded to not flying too high, is also substantially lower than the value of $B_1$. On the other hand, the value of $B_4$, which indicates the weight accorded to not running out of fuel, is set so that the risk of endangerment due to the fuel running out before the mission is completed is minimized.

To summarize, the control signal $u_\Theta$, $u_\psi$ that minimizes the cost function J(k) is determined in step 9. A flight path associated with the determined control signal is also derived. In a next step 10, the coordinates x(k+1), y(k+1), z(k+1) that produced the lowest value of J(k) in step 9 are registered. If the distance between the position x(k+1), y(k+1), z(k+1) and the end position $x_{end}$, $y_{end}$ and $z_{end}$ exceeds the given distance d, a step 11 k=k+1 is added, whereupon the process is repeated from step 9.

The path vector that is input to the second calculating unit 4 consists of a relatively large number, here designated R, of breakpoints, wherein the distance between the breakpoints is $s_o$. As noted above, $s_o$ is characteristically 200-300 m. The second calculating unit is arranged so as to create a route consisting of a reduced number of breakpoints by functioning as per the scheme shown in FIG. 3.

In a first step 13, a determination is made as to whether a line of sight exists between the start point ($P_1$=x(1), y(1), z(1) and the end point $P_2$=x(n=R), y(n=R), z(n=R). A line of sight is defined as the straight line between two points that does not pass through terrain or threat zones. If the line of sight is not unobstructed, then a point closer to the start point $P_1$ is chosen, whereupon a determination is again made as to whether an unobstructed line of sight exists between the points $P_1$ and $P_2$. This process is repeated until a point $P_2$ is found where the line of sight to $P_1$ is unobstructed. In the example shown in the figure, n is decreased 14 in single step increments, with a determination being made each time as to whether an unobstructed line of sight is present. It will be apparent to one skilled in the art that methods exist that may be more efficient than decreasing in single step increments from the end position when searching for the point $P_2$ that is located farthest from $P_1$ but still offers an unobstructed line of sight. The invention must not be viewed as being limited to the method for finding $P_2$ described herein.

Once an unobstructed line of sight between the point pair $P_1$, $P_2$ has been found, the coordinates for the point pair are stored. If the point $P_2$ does not coincide with the end point $x_{end}$, $y_{end}$ and $z_{end}$ for the mission, then the process is repeated in order to find a line of sight between $P_2$ and a point $P_3$, where initially $P_3$=x(n=R), y(n=R), z(n=R). If there is no unobstructed line of sight between $P_2$ and $P_3$, then n is decreased in single step increments as above, whereupon a determination is made as to whether an unobstructed line of sight exists. When a point $P_3$ is found that has an unobstructed line of sight to $P_2$ a determination 16 is made as to whether $P_3$ coincides with the end point for the mission. If such is not the case, the foregoing process is repeated until all breakpoints $P_1$, $P_2$, etc. for the refined route are found. The refined breakpoints $P_1$, $P_2$, etc. determined in the second calculating unit 4 are delivered 17 to the display 5.

Figure 4:
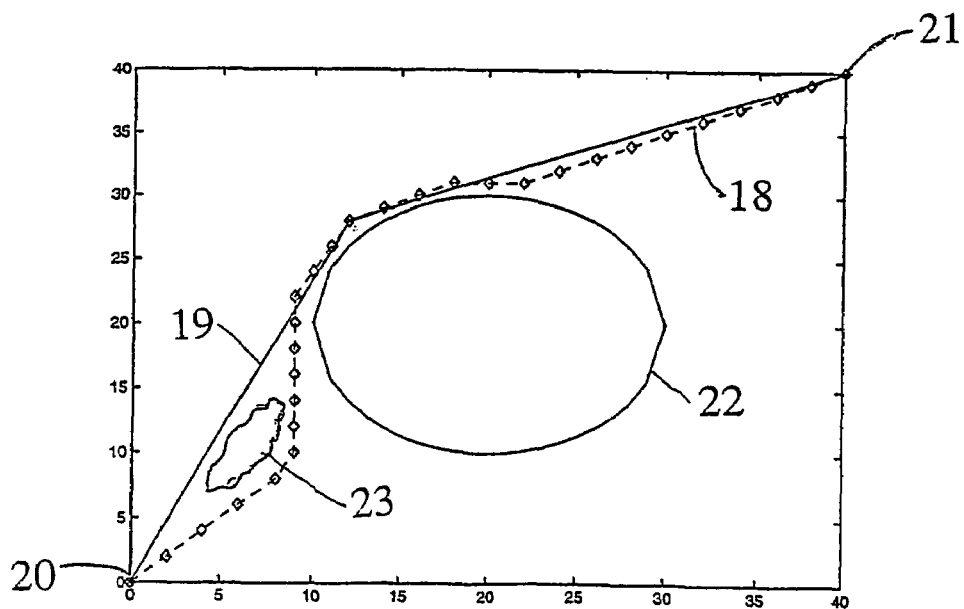
FIG. 4 shows an example of the route predicted by the first calculating unit and the refined route calculated by the second calculating unit.

Reference 20 in FIG. 4 designates the start position and reference 21 the end position of the route. The preliminary route 18 calculated by the first calculating unit 3 and the refined route 19 calculated by the second calculating unit 4 are marked between the start position 20 and the end position 21. In addition to containing a limited number of breakpoints relative to the preliminary route, the refined route is also shorter than the preliminary route. This is attributable to the fact that the preliminary route is calculated using a limited prediction horizon. The threat zones 22, 23 are thus not detected until they fall within the prediction horizon, so that the results lead, in certain situations, to the preliminary route not being the shortest conceivable route.

The invention claimed is:

1. A method for calculating a flight route between a first position and a second position, wherein the first position is initially chosen as a current position, and wherein the following steps are repeated until the second position is reached:
   a loss function is determined corresponding to each flight path in a set of flight paths that are predefined in relation to a current direction of flight;
   a flight path that yields a most advantageous value for the loss function is selected;
   a subsection from the current position and a predetermined number of positions forward are registered for the selected flight path;
   a position at an end of the subsection is chosen as a new current position;
   wherein after the flight route has been calculated between the first and the second position, the calculated route is refined in a refining step, in which registered points that are located as far from one another as possible but between which unobstructed visibility prevails are marked as breakpoints, and in that the route is chosen as straight lines between these marked breakpoints.

2. A method according to claim 1, wherein the loss function includes at least a subset of the following parameters:
   a first parameter that indicates whether the selected flight path crosses predefined threat zones;
   a second parameter that indicates whether the selected flight path passes too near to terrain;
   a third parameter that indicates whether the selected flight path exceeds a predefined altitude value;
   a fourth parameter that indicates whether the selected flight path is costly from a fuel standpoint;
   a fifth parameter that indicates a distance to a second position of the route.

3. A method according to claim 1, wherein the flight paths in the flight path set are selected based on a control signal sequence belonging to each flight path.

4. A method according to claim 3, wherein a second through a final signal in each control signal sequence are zeroed.

5. A method according to claim 1, wherein the predetermined number of positions forward is one.

6. A system for calculating a flight route for an aircraft between a first position and a second position, wherein the system comprises:
   a terrain database arranged so as to store terrain data, including latitude and longitude data with associated altitude data;
   a threat database arranged so as to store data concerning threats, including at least data concerning a geographical extent of the threats;
   a first calculating unit that is operatively connected to the terrain database and the threat database and arranged so as to calculate a route between the first and the second positions, whereupon the first calculating unit operates according to a predetermined scheme, wherein the first position is initially selected as a current position, and wherein the following steps are repeated until the second position is reached:
   a loss function is determined corresponding to each flight path in a set of flight paths that are predefined in relation to a current direction of flight;
   a flight path that yields a most advantageous value for the loss function is selected;
   a subsection from the current position and a predetermined number of positions forward are registered for the selected flight path, and
   a position at an end of the subsection is chosen as a new current position;
   and wherein the first calculating unit, the terrain database and the threat database are operatively connected to a second calculating unit, which is arranged so as to receive the flight route calculated by the first calculating unit and refine it, whereupon registered points that are located as far as possible from one another, but between which unobstructed visibility prevails, are marked as breakpoints, and in that the route is chosen as straight lines between these marked breakpoints.

7. A system according to claim 6, characterized in that the entire system is implemented in the aircraft.

8. A system according to claim 6, characterized in that the system is partly implemented in the aircraft and partly in a ground-based station, whereupon data are communicated between the aircraft the ground-based station via a link.

* * * * *